United States Patent [19]

Harris

[11] Patent Number: 4,852,861
[45] Date of Patent: Aug. 1, 1989

[54] END CAP ASSEMBLY FOR AIR SPRING

[75] Inventor: Robert S. Harris, Indianapolis, Ind.

[73] Assignee: The Firestone Tire & Rubber Company, Akron, Ohio

[21] Appl. No.: 291,889

[22] Filed: Dec. 29, 1988

[51] Int. Cl.⁴ .............................................. F16F 9/04
[52] U.S. Cl. .................... 267/64.27; 267/122
[58] Field of Search ................ 267/64.11, 122, 64.19, 267/64.21, 64.23, 64.24, 64.27, 64.25, 118, 153; 74/18.2; 277/101, 103, 152; 92/98 D, 103; 280/711, 712

[56] References Cited

U.S. PATENT DOCUMENTS

| | | | |
|---|---|---|---|
| 3,788,628 | 1/1974 | Hotz, Jr. et al. | 267/65 R |
| 3,870,286 | 3/1975 | Willich | 267/64 R |
| 4,378,935 | 4/1983 | Brown et al. | 267/64.27 |
| 4,489,474 | 12/1984 | Brown et al. | 29/508 |
| 4,573,692 | 3/1986 | Frank et al. | 277/152 |
| 4,629,170 | 12/1986 | Warmuth, II | 267/64.27 |
| 4,673,168 | 6/1987 | Warmuth et al. | 267/122 X |
| 4,718,650 | 1/1988 | Geno | 267/64.27 |
| 4,784,376 | 11/1988 | Ecktman | 267/64.27 |
| 4,787,606 | 11/1988 | Geno et al. | 267/64.27 |
| 4,787,607 | 11/1988 | Geno et al. | 267/64.27 |
| 4,787,608 | 11/1988 | Elliott | 267/64.27 |

FOREIGN PATENT DOCUMENTS 911789 2/1961 United Kingdom .

Primary Examiner—Douglas C. Butler
Attorney, Agent, or Firm—Ronald Brietkrenz

[57] ABSTRACT

An air spring is formed by an axially spaced end cap and a piston member and has an intervening elastomeric flexible sleeve extending therebetween which forms a fluid pressure chamber. An annular clamp ring having a recess on the inner diameter thereof coacts with a corresponding annular projection formed on the end cap to positionally locate the ring on the end cap. A pair of clamping surfaces are located on opposite sides of the projection and are separated therefrom by expansion grooves. The annular projection and clamping surfaces form a series of pinch areas with the intervening sleeve, which sealingly clamp the sleeve therebetween. The expansion grooves receive portions of the sleeve and change the direction of reinforcing cords within the sleeve. The clamp ring abuts against a radially extending surface of the end cap to reduce axial movement of the ring during operation of the air spring. An annular groove which is formed in the end cap traps and conceals the uncompressed end of the sleeve which extends beyond the clamp ring to increase the holding power of the clamp ring.

17 Claims, 2 Drawing Sheets

END CAP ASSEMBLY FOR AIR SPRING

BACKGROUND OF THE INVENTION

1. TECHNICAL FIELD

The invention relates to end caps for air springs, and more particularly to the clamping means adapted to affix a resilient elastomeric sleeve member to a relatively rigid cap or piston member of an air spring. Specifically, the invention relates to a clamp assembly for an air spring employing an annular recess in the end cap which provides a hidden cavity for an uncompressed end of the sleeve member which extends beyond the compressed sealing area of the sleeve.

2. BACKGROUND INFORMATION

Pneumatic springs commonly referred to as air springs, have been used for motor vehicles for a number of years to provide cushioning between moveable parts of the vehicle, primarily to absorb shock loads impressed on the vehicle axles by the wheels striking an object in the road or falling into a depression. The air spring usually consists of a flexible rubber sleeve or bellows containing a supply of compressed fluid and has one or more pistons located within the flexible sleeve. The piston causes compression and expansion of the fluid within the sleeve as the sleeve compresses and expands as the vehicle experiences the road shock. The spring sleeve is formed of a flexible elastomeric material which permits the piston to move axially with respect to another piston or end cap secured within the ends of the sleeve.

The ends of the sleeves are sealingly connected to the piston and/or opposite end cap and are always one of the important and major aspects in producing an efficient and maintenance free air spring. One problem with certain air springs is that the exposed cut edge at the end of the elastomeric sleeve of the air spring will engage the sleeve body as it rolls along the piston or end cap in excessive stroke conditions causing excess wear to the flexible sleeve. Another problem with existing air springs, and in particular, the clamp ring therefore, is that the clamp ring will move in its clamped position under dynamic air spring conditions causing movement of the clamped elastomeric material therebetween tending to loosen the sealing engagement and deteriorating the clamp integrity and causing ultimate air spring leakage and failure. This ring movement is especially critical during the jounce or collapsing stroke.

Another problem with existing air springs and the clamping of the elastomeric sleeve ends to the piston member and/or end cap is to secure a sufficiently tight seal to be able to withstand high fluid pressures contained in the fluid chamber without premature leakage or bursting even upon experiencing severe air spring movement and being exposed to the harsh environments on the undercarriage of a vehicle.

Some examples of air springs and band sealing devices are shown in the following patents described below:

U.S. Pat. No. 3,788,628 discloses a pneumatic spring-type system including a structure for anchoring the inner ends of a flexible rolling sleeve. The sleeve is positioned between surfaces characterized by having a saw-toothed shape with a circumferential groove and rib on an inner circumferential surface and two ribs on an outer circumferential surface. The opposite sides of the grooves converge at predefined angles with predetermined and matching radii of curvatures, the combination of which provides a gripping action to hold the flexible sleeve firmly in place by means of the saw-tooth design in cooperation with the matching recess of the ring and sleeve flange.

U.S. Pat. No. 3,870,286 relates to a fluid spring wherein the ends of the rolling sleeve are secured by annular clamping rings which engage against the internal surface of the sleeve. The clamping ring secures the rolling sleeve to the working cylinder with the clamping ring containing an annular groove type deformation by which the rolling sleeve is held in place by virtue of this interacting groove-shaped design in combination with the clamping force exerted by the ring.

U.S. Patent No. 4, 489,474 relates to means for connecting a tubular flexible member to a piston which includes a recess near the piston end which is secured to a flexible member. The flexible member is wrapped over and around a ring-shaped fitting which secures the flexible member to the piston. The piston comprises a circumferentially extending recess adjacent to its end with the flexible sleeve being positioned and substantially filling the recess of the piston. The ring-shaped fitting is a conventional swaged ring and the end portion of the flexible member is trimmed from the portion extending from the piston ring with the flexible member substantially filing the recess of the shoulder of the piston. The piston employs a serrated edge to assist in griping of the flexible member.

U.S. Pat. No. 4,457,692 discloses an assembly for sealing two members, one of which has a cylindrical surface which supports the seal, wherein a sealing lip is provided to bear against the second member. A cylindrical surface supports the seal which comprises a hollow-cylindrical body having a lip which extends outwardly from the body with an elastomeric band circling the body to hold it firmly in place. The cylindrical surface contains a recess which extends circumferentially around the surface and receives a matching projecting element of the seal which extends from the inside diameter of the cylindrical body.

U.S. Pat. No. 4,629,170 relates to a pneumatic spring with a pair of chambers formed by a pair of membranes that are sealingly attached to an axially spaced apart retainer and piston wherein the axial end of the membrane is compressed between a serrated surface of a solid member and a retaining ring wherein the ring may be swaged, fitted or otherwise tightened to produce radial compression against the axial ends of the flexible membranes.

British Pat. No. 199,789 discloses a metal securing band which grips a diaphragm and forces it against a tapered end portion of a tubular member.

U.S. Pat. No. 4,718,650 shows an air spring in which the ends of the flexible sleeves are connected to the sealing surfaces of a pair of axially spaced pistons by swaged crimped clamping rings. The piston clamping surfaces are formed with serrations for assisting to retain the elastomeric material when forced therein by the clamping rings.

Other types of piston and end cap sealing arrangements for air springs are shown in pending patent application U.S. Ser. Nos. 62,984: filed June 17, 1987; 94,479, filed June 8, 1987; and U.S. Pat. No. 4,784,376 all of which have been assigned to the Assignee of the present invention.

Another known prior art air spring construction includes a radially extending shoulder formed on the piston member on which the clamping ring seats and sealingly clamps the cut end of the flexible sleeve against a plurality of uniformity raised ribs formed on the axially extending sealing surface of the piston member adjacent the annular shoulder. However, in such construction the clamp ring is not positively positioned on the annular shoulder, and is free to move in an upward axial direction upon the air spring experiencing severe jounce or extended positioning, and the entire end of the sleeve is in a compressed state.

SUMMARY OF THE INVENTION

Objectives of the invention include providing an improved end cap assembly for air springs, primarily for motor vehicles having a piston at one end and an end cap at an axially spaced opposite end with a flexible elastomeric sleeve extending therebetween and clamped against the respective end cap or piston member by a clamp ring to form a fluid tight seal therebetween and provide an intervening pressured chamber.

Another objective of the invention is to provide such an improved end cap assembly in which the cut edge of the elastomeric sleeve which extends beyond the clamp ring is not exposed thereby eliminating excessive wear of the elastomeric sleeve that heretofore rubbed on the exposed edge during dynamic movement of the air spring.

A still further objective of the invention is to provide such an end cap assembly in which movement of the clamp ring is reduced when operating under dynamic conditions by positioning the ring directly against an annular flange of the end cap thereby maintaining a positive sealing effect with the elastomeric sleeve clamped between the ring and a sealing surface of the end cap.

A still further objective of the invention is to provide such an improved end cap assembly in which the end cap clamping surface includes a raised male projection which acts in cooperation with a corresponding female or concave groove on the clamp ring to facilitate efficient gripping of the elastomeric material therebetween and to alter the direction of the reinforcing cords contained within the elastomeric sleeve to further increase the clamping effect of the ring, and which construction positionally locates the clamp ring on the sealing surface of the end cap.

A still further objective is to provide such an improved end cap assembly in which annular expansion grooves are formed between annular projections on the end cap sealing surfaces to permit the elastomeric material to flow therein; and in which another annular axially extending groove is provided adjacent the cut end of the elastomeric sleeve for trapping a substantially uncompressed cut end of the elastomeric sleeve which extends beyond the clamping to prevent its exposure and subsequent contact with the moving elastomeric sleeve during dynamic conditions.

Another objective is to provide such an improved end cap assembly in which the outer surface of the clamp ring generally aligns with the adjacent outer surface of the end cap to provide a generally continuous surface between the clamp ring and end cap over which the elastomeric sleeve rolls to provide a smooth interface therebetween to reduce wear on the elastomeric sleeve as it moves along the surfaces of the end cap and clamping ring during dynamic operation of the air spring.

These objectives and advantages are obtained by the improved air spring of the invention, the general nature of which may be stated as including a pair of end members adapted to be mounted at generally axially spaced locations; a flexible sleeve formed of an elastomeric material containing reinforcing cords and having open ends sealingly engaged with the end members forming a pressurized fluid chamber therebetween; an annular axially extending sealing surface formed on at least one of said end members, said sealing surface being formed with a pair of axially spaced annular clamping surfaces and an intermediate annular projection extending radially outwardly beyond said clamping surfaces; a continuous clamp ring located concentrically with respect to the annular sealing surface for sealingly clamping one end of the flexible sleeve therebetween, said clamp ring having an axially extending inner clamping surface formed with a concave recess cooperating with the intermediate projection to positionally locate said ring with respect to said one end member, and with said projection and spaced clamping surfaces of the clamp ring providing a series of axially spaced pinch areas for clamping the flexible sleeve therebetween and for changing the direction of travel of the reinforcing cords in the clamped sleeve end; and groove means being formed in the said one end member for trapping a substantially uncompressed end of the flexible sleeve therein, which end extends beyond the clamp ring.

BRIEF DESCRIPTION OF THE DRAWINGS

A preferred embodiment of the invention illustrative of the best mode in which applicant has contemplated applying the principles, is set forth in the following description and is shown in the drawings and is particularly and distinctly pointed out and set forth in the appended claims.

Similar numerals refer to similar parts throughout the drawings.

DESCRIPTION OF THE PREFERRED EMBODIMENT

Figure 1:
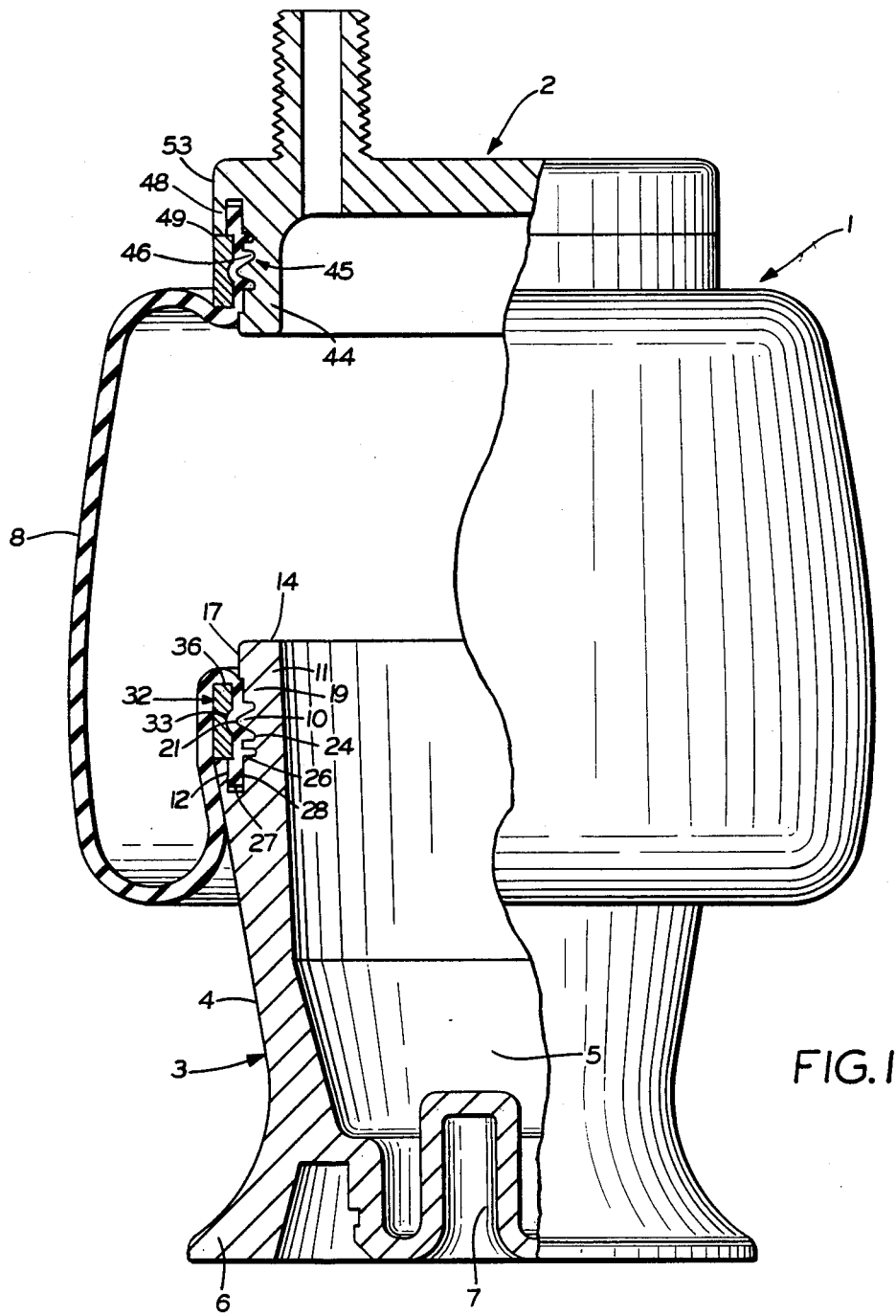
FIG. 1 is an elevational view of the improved end cap assembly incorporated into an air spring with portions broken away and in section, with the air spring being shown in a static at-rest position.

The improved end cap assembly of the invention is shown mounted on an air spring indicated generally at 1, which is shown in an at-rest position in FIG. 1. Air spring 1 includes axially spaced end members consisting of the improved end cap and a piston member indicated generally at 2 and 3 respectively. Piston member 3 is a cup-shaped member having a generally conical shaped outer wall 4 forming an open interior 5 in a base 6 which is formed with a recessed central portion 7. A flexible sleeve 8 of elastomeric material containing internal reinforcing cords 9, (FIG. 2) extends between end cap 2 and piston member 3 which are clampingly engaged within the open ends of the sleeve by a clamp ring 32. Sleeve 32 forms an internal fluid pressure chamber 18.

An axially extending clamping surface indicated generally at 10, is formed on a reduced diameter upper end portion 11 of piston member 3 as shown in FIG. 1. Clamping surface 10 is connected to conical outer wall 4 of the piston member by a radially extending shoulder 12 and a curved corner 13. The open outer end of piston end portion 11 has a radially extending flat surface 14 and a rounded corner 15 which communicates with an annular lip 16 by a generally conical surface 17.

Figure 5:
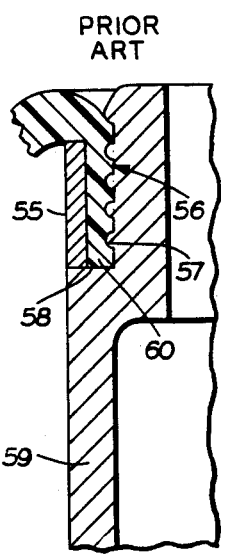
FIG. 5 is an enlarged fragmentary sectional view of a known prior art air spring clamp ring sealing arrangement.
Figure 3:
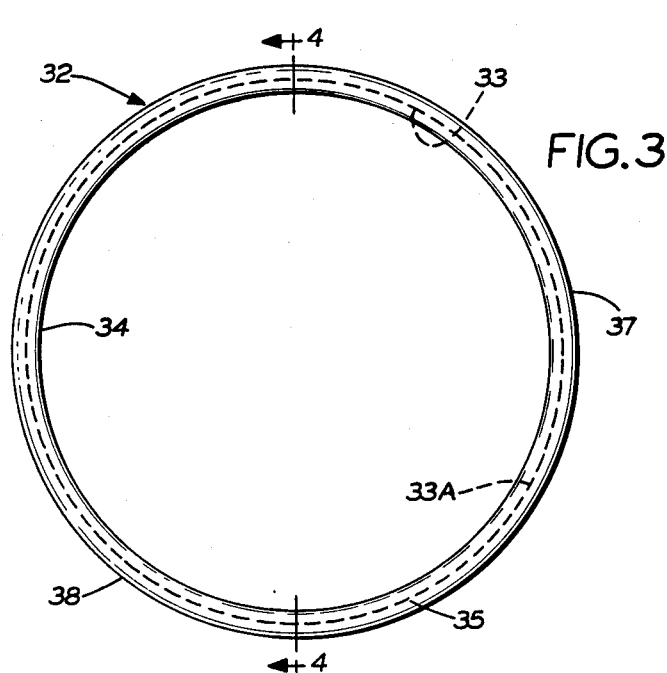
FIG. 3 is a top plan view of the clamp ring of the clamp ring assembly.
Figure 4:
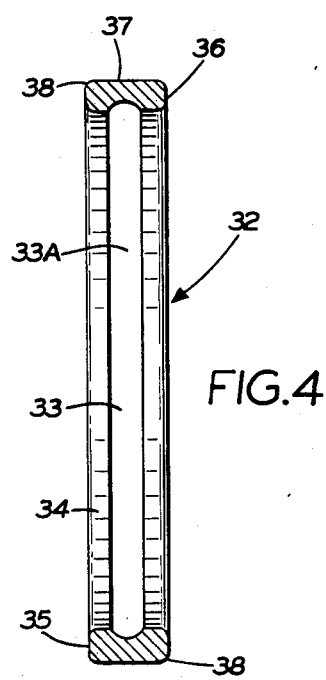
FIG. 4 is a sectional view of the clamp ring taken on line 4—4, FIG. 3.

FIG. 5 illustrates one type of known prior art clamp ring and sealing surface arrangement similar to that of the present disclosure. A clamp ring 55 is mounted concentrically about an annular sealing surface 56 which is formed with a plurality of small uniform annular ribs 57. Ring 55 is located adjacent a radially extending annular shoulder 58 formed on piston member 59. However, with this prior art air spring construction, there is no means for accurately positioning or maintaining the clamp ring against shoulder 58 since annular ribs 57 merely compress into the elastomeric material of sleeve end 60 to provide an air seal therebetween. Ring 55 must rely on its radial clamping engagement against axially extending sealing surface 56 to retain it in position against shoulder 58 and relies upon the ability of the installer at the time of installation to insure that it is properly positioned against shoulder 58. Most importantly this prior art clamp ring assembly compresses the entire end of the sleeve and does not provide for the extension of a substantially uncompressed end of the sleeve into a cavity to increase the holding power of the end member as in the present invention.

Piston clamping surface 10 includes a pair of annular radially extending clamping projections 19 and 20 and an intermediate radially outwardly extending annular projection 21. Annular projections 19 and 20 preferably have axially extending flat outer surfaces with intermediate projection 21 terminating in a convexly curved outer surface. Intermediate projection 21 is separated from adjacent projections 19 and 20 by a pair of annular material expansion grooves 23 and 24 which diverge inwardly and away from projection 21 to provide expansion areas or zones for the movement of the elastomeric material of flexible sleeve 8 therein. Another radially inwardly extending groove 26 is formed between projection 20 and annular shoulder 12 and forms a reservoir for receiving the elastomeric material squeezed outwardly by the clamping force of projection 20.

In accordance with one of the features of the invention an axially extending annular groove 28 is formed in piston wall 4 for receiving and trapping substantially uncompressed cut end 27 of elastomeric sleeve 8 and to provide for the expansion of the elastomeric material therein. This trapping of uncompressed sleeve end 27 prevents it from being exposed and in contact with the remaining portion of the sleeve as the sleeve moves under dynamic conditions which heretofore may have caused unwanted abrasion to the sleeve. It also provides uncompressed non-working material beyond the flexing and the compressed sealing areas of the elastomeric material caused by clamp ring 32.

Clamp ring 32 (FIG. 2) preferably is formed of aluminum or high strength plastic. Ring 32 is formed with a central recess 33 in an inner axially extending surface 34 thereof which is generally centered between circumferential end surfaces 35 and 36. Inner surface 34 preferably is parallel with an axially extending outer diameter ring surface 37, with inner and outer diameter surfaces 34 and 37 being connected to circumferential end surfaces 35 and 36 by rounded corners 38 (FIG. 2).

Referring again to FIG. 1, recess 33 of clamp ring 32 aligns and cooperates with intermediate convex projection 21 of piston clamping surface 10 to positionally align the clamping ring on the piston surface for receiving the open end of flexible sleeve 8 therebetween. In this position, circumferential surface 35 of the clamp ring seats upon annular shoulder 12 which prevents movement of clamp ring 32 in the downward axial direction. This is especially critical during the jounce or collapse position of the air spring in which end member 2 moves axially toward piston member 3. Heretofore, this axial movement of the air spring especially during jounce, could cause movement of the clamp ring resulting in a loosening of the clamping engagement with the sleeve end resulting in premature failure or leakage of the fluid chamber.

Also, as shown in FIG. 1, outer clamp ring surface 37 generally aligns with the junction of rounded corner 13 and conical wall 4 of piston member 3 to provide a smooth continuous transition between the adjacent surfaces. This transition avoids any abrupt changes in direction, or sharp corners or other projections which could damage the flexible sleeve as it moves along and between the adjacent surfaces during dynamic operation of the air spring and provides a generally continuous surface over which the sleeve material moves to reduce excessive wear thereon.

Figure 2:
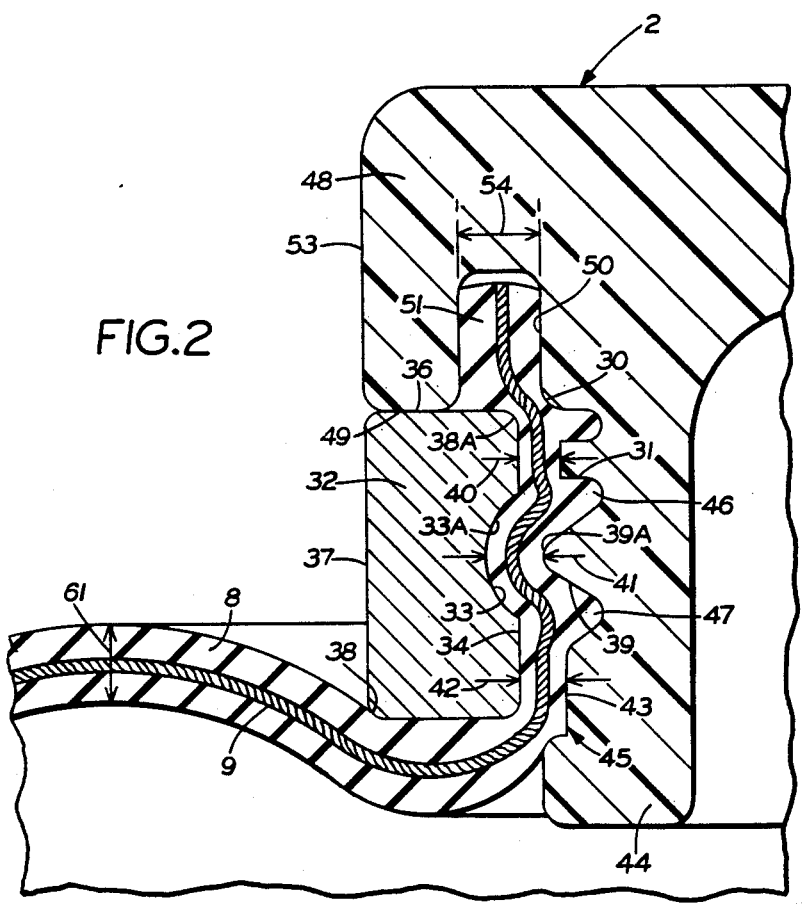
FIG. 2 is a greatly enlarged fragmentary sectional view showing a clamp ring securing one end of the elastomeric sleeve against the sealing surface of the improved end cap.

Referring to FIG. 2, end cap 2 is formed with an annular axially extending body 44 having an outer axially extending annular sealing surface indicated generally at 45. Sealing surface 45 is formed with a series of axially spaced grooves and projections similar to that formed in clamping surface 10 of piston member 3, which are described in greater detail below. Furthermore, the end cap clamp ring is similar to that of clamp ring 32 of the piston member and thus is described by the same numerals. End cap 2 is provided with an outer annular flange 48, the lower edge 49 of which prevents the axial movement of clamping ring 32 in a similar manner as does shoulder 12 of piston member 3 during the air spring experiencing dynamic operation.

In accordance with one of the main features of the invention, annular flange 48 is spaced from end cap body 44 and forms an axially extending annular recess 50 in which uncompressed cut end 51 of flexible sleeve 8 is trapped in an unexposed and concealed manner.

End cap 2 further includes an annular lip 30 which is spaced from clamp ring corner 38A a distance less than the uncompressed thickness of sleeve 8, to provide a first pinch area on the elastomeric sleeve material. Sealing surface 45 further includes a first annular projection 31 which is spaced a radial distance 40 from inner surface 34 of clamp ring 32, a distance approximately one-half the thickness of flexible sleeve 8 to provide another pinch area. Likewise, a convex outer surface 39A of intermediate projection 39 is located a radial distance 41 from the bottom surface of recess 33, a distance also less than the thickness of flexible sleeve 8 to form another pinch area. Likewise, the axially extending outer surface of a second annular projection 43 formed on sealing surface 45 is located a radial distance 42 from adjacent ring surface 34 to form still another pinch area for clamping the elastomeric material therebetween.

First project 31 preferably has a similar diameter than that of second projection 43 so as to form a uniform gripping or pinch action against the elastomeric sleeve material against the adjacent axially extending inner surface of clamp ring 32. Intermediate projection 39 has a larger diameter than that of projections 31 and 43 so as to extend a further distance into clamp ring recess 33. A pair of diverging grooves 46 and 47 which are similar to grooves 23 and 24 of piston member 3 are formed in sealing surface 45 on opposite sides of intermediate projection 39 to provide for the movement or expansion of the elastomeric material therein adjacent each of the pinch areas as the material is squeezed outwardly by the pinching or compression of the elastomeric material at these areas to ensure a tight clamping engagement at the pinch areas.

As shown particularly in FIG. 2, reinforcing cords 9 are caused to change directions due to the radial outward extension of intermediate projection 39 into aligned clamping ring recess 33. This provides a tighter and more stable clamping engagement with the trapped sleeve end since a greater force will be required to pull the sleeve end from between the clamp ring and clamping surface of the piston member, then would be required if the trapped elastomeric material and reinforcing cords were in a generally straight alignment.

In a preferred embodiment, elastomeric sleeve 8 will have a thickness as shown by arrow 61 in FIG. 2 of approximately 0.120 inches. Pinch distances 40 and 42 will be approximately 0.060 inches and pinch distance 41 will be approximately 0.080 inches. However, these dimensions may vary but have been found to provide a very suitable clamping relationship between improved clamp ring 32 and piston clamping surface 45 providing a seal able to withstand relatively high internal fluid pressures in chamber 18 in one type of air spring configuration.

The relationship of the various grooves and projections of end member sealing surface 45 in cooperation with clamp ring 32 is generally similar to that between clamp ring 32 and piston clamping surface 10. Also, outer diameter surface 37 of clamp ring 32 axially aligns with the outer annular surface 53 of end cap flange 48 to provide a generally continuous surface over which the flexible sleeve 8 will move when the air spring is in the jounce position to avoid any sharp corners or projections and to provide a continuous transition between the aligned surfaces in a similar manner as provided by clamp ring surface 37 and outer wall 4 of the piston member described above.

As shown particularly in FIG. 2, enlarged annular groove or recess 50 formed in end cap 2 preferably has a width indicated at 54, generally equal to or slightly larger than the uncompressed thickness of sleeve 8 indicated at 61. This provides a concealed cavity for the substantially uncompressed end 51 of sleeve 8 which provides uncompressed non-working, moving elastomeric material beyond the flexing and compressed sealing areas of the elastomeric material caused by clamp ring 32. This arrangement has been formed to increase the sealing and retention effect of the clamp ring on the sleeve end at the end cap. Uncompressed end 51 will be expanded outwardly to completely fill in a radial direction, groove 50 due to the compression or squeezing of the sleeve material by projection 31 and annular lip or corner 30.

Accordingly, the improved end cap assembly is simplified, provides an effective, safe, inexpensive, and efficient assembly which achieves all the enumerated objectives, eliminates difficulties encountered with prior art clamping assemblies, and solves problems and obtains new results in the art.

In the foregoing description, certain terms have been used for brevity, clearness and understanding; but no unnecessary limitations are to be implied therefrom beyond the requirements of the prior art, because such terms are used for descriptive purposes and are intended to be broadly construed.

Moreover, the description and illustration of the invention is by way of example, and the scope of the invention is not limited to the exact details shown or described.

Having now described the features, discoveries and principles of the invention, the manner in which the improved end cap assembly for air springs is constructed and used, and characteristics of the improved assembly, and the advantageous, new and useful results obtained; the new and useful structures, devices, elements, arrangements, parts, and combinations, are set forth in the appended claims.

I claim:

1. An improved air spring including:
   (a) a pair of end members adapted to be mounted at generally axially spaced locations;
   (b) a flexible sleeve formed of an elastomeric material containing reinforcing cords and having open ends sealingly engaged with the end members forming a pressurized fluid chamber therebetween:
   (c) an annular axially extending sealing surface formed on at least one of said end members said sealing surface being formed with a pair of axially spaced annular clamping surfaces and an intermediate annular projection extending radially outwardly beyond said clamping surfaces;
   (d) a continuous clamp ring located concentrically with respect to the annular sealing surface for sealingly clamping one end of the flexible sleeve therebetween, said clamp ring having an axially extending inner clamping surface formed with a concave recess cooperating with the intermediate projection to positionally locate said ring with respect to said one end member, and with said projection and spaced clamping surfaces of the clamp ring providing a series of axially spaced pinch areas for clamping the flexible sleeve therebetween and for changing the direction of travel of the reinforcing cords in the clamped sleeve end; and
   (e) groove means being formed in the said one end member for trapping and concealing a substantially uncompressed end of the flexible sleeve therein, which end extends beyond the clamp ring.

2. The air spring defined in claim 1 in which the pair of axially spaced clamping surfaces are separated from the intermediate projection by annular grooves providing expansion areas for certain portions of the flexible sleeve compressed by said clamping surfaces.

3. The air spring defined in claim 1 in which a generally radially extending surface is formed on said one end member which abuts with a circumferential end of the clamp ring to restrict axial movement of said ring during operation of the air spring.

4. The air spring defined in claim 3 in which the said one end member is an end cap with the axial clamping surface thereof extending into the open end of the flexible sleeve; and in which the radially extending surface of said one end member is an annular retaining flange extending generally parallel with and spaced from a portion of the sealing surface of said one end member.

5. The air spring defined in claim 4 in which the groove means extends in an axial direction in the space between the annular retaining flange and sealing surface.

6. The air spring defined in claim 5 in which the groove means has a radial width greater than the uncompressed thickness of the flexible sleeve.

7. The air spring defined in claim 6 in which the reinforcing cords extend into the groove means.

8. An improved air spring including:
(a) a pair of end members adapted to be mounted at generally axially spaced locations, at least one of said end members being formed with a radially outwardly extending annular abutment surface;
(b) a flexible sleeve formed of an elastomeric material having open ends sealingly engaged with the end members forming a pressurized fluid chamber therebetween;
(c) an annular axially extending sealing surface formed on said one end member, said sealing surface having an annular projection spaced axially from the annular abutment surface and extending radially outwardly at distance less than said annular shoulder;
(d) a continuous clamp ring located concentrically with respect to the annular sealing surface for sealingly clamping one end of the flexible sleeve therebetween, said clamp ring abutting the annular abutment surface to restrict movement of said ring in an axial direction during operation of the air spring, said clamp ring having an axially extending inner clamping surface formed with a concave recess cooperating with the annular projection on the sealing surface to positionally locate said ring with respect to the annular shoulder and sealing surface of said one end member; and
(e) an annular groove formed in said one end member adjacent the annular abutment surface for containing said one end of the flexible sleeve therein, which end extends beyond the clamp ring.

9. The air spring defined in claim 8 in which the sealing surface of said one end member is formed with a pair of annular clamping surfaces axially spaced about the annular projection; in which said clamping surfaces are separated from the annular projection by annular grooves; and in which said annular clamping surfaces have generally equal diameters.

10. The air spring defined in claim 8 in which the clamp ring has an outer annular axially extending surface which axially aligns with an outer annular surface of said one end member to provide a substantially continuous exterior surface on which the flexible sleeve rolls during operation of the air spring.

11. An improved air spring including:
(a) a piston member for mounting the air spring on a supporting structure, said piston member having a piston body formed with an annular axially extending sealing surface terminating in a radially outwardly extending shoulder, said sealing surface being formed with a radially outwardly extending intermediate annular projection and a pair of spaced radially extending annular end projections;
(b) a flexible sleeve formed of an elastomeric material having open ends sealingly engaged with the piston member and an end cap spaced axially from the piston member and forming a pressurized fluid chamber therebetween;
(c) a continuous annular clamp ring located concentrically about the annular sealing surface of the piston member and clamping one end of the flexible sleeve therebetween, said clamp ring having an axially extending inner clamping surface formed with a concave recess which radially aligns with the intermediate projection of the piston member and a pair of adjacent surfaces each of which aligns with a respective one of the piston member end projections for positionally locating the clamp ring with respect to the piston member and for forming a generally air-tight seal therebetween; and
(d) axially extending groove means formed in the piston body for receiving an uncompressed end of the flexible sleeve which extends beyond the clamp ring.

12. The air spring defined in claim 11 in which the pair of end projections of the piston member terminate in generally flat axially extending end surfaces.

13. The air spring defined in claim 12 in which the end surfaces of the pair of end projections extend generally parallel with the axially extending inner surface of the clamp ring.

14. The air spring defined in claim 11 in which the intermediate projection of the piston member sealing surface has a generally convex cross-sectional configuration and terminates in a curved outer end; and in which the intermediate projection is separated from the end projections by annular concave grooves.

15. The air spring defined in claim 11 in which the groove means has a radial width at least equal to the thickness of the flexible sleeve.

16. The air spring defined in claim 11 in which a circumferential edge surface of the clamp ring generally seats upon the radially extending shoulder of the piston member to reduce axial movement of the clamp ring during operation of the air spring.

17. The air spring defined in claim 16 in which the annular shoulder of the piston member terminates into the piston body by a curved corner; and in which the clamp ring has an outer annular axially extending surface which generally aligns with curved corner of the piston body to provide a substantially continuous surface on which the flexible sleeve may roll during operation of the air spring.

* * * * *